(12) United States Patent
Zeiger et al.

(10) Patent No.: US 8,224,137 B2
(45) Date of Patent: Jul. 17, 2012

(54) APPARATUS WITH TWO HOUSINGS INCLUDING A ROTATABLE OPTICAL DATA COMMUNICATION COUPLING

(75) Inventors: David R. Zeiger, Mundelein, IL (US); Rachid M. Alameh, Crystal Lake, IL (US); Mark W. Oliver, Mundelein, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1124 days.

(21) Appl. No.: 11/870,452

(22) Filed: Oct. 11, 2007

(65) Prior Publication Data

US 2012/0057818 A1    Mar. 8, 2012

(51) Int. Cl.
G02B 6/42    (2006.01)
(52) U.S. Cl. .......................... 385/25; 455/575.3
(58) Field of Classification Search ............... 455/575.3; 385/25
See application file for complete search history.

(56) References Cited

U.S. PATENT DOCUMENTS

| | | |
|---|---|---|
| 5,271,076 A | 12/1993 | Ames |
| 5,889,602 A | 3/1999 | Johnson et al. |
| 5,949,565 A | 9/1999 | Ishida |
| 6,470,132 B1 | 10/2002 | Nousiainen et al. |
| 7,074,045 B2 | 7/2006 | Kawahigashi et al. |
| 7,338,193 B1 | 3/2008 | Zeiger et al. |
| 7,353,049 B2 | 4/2008 | Mizuta |
| 7,376,299 B2 * | 5/2008 | Schorpp et al. ............... 385/25 |
| 7,636,523 B2 | 12/2009 | Schorpp |
| 7,672,641 B2 | 3/2010 | Yu et al. |
| 7,873,279 B2 | 1/2011 | Alameh et al. |
| 2001/0043379 A1* | 11/2001 | Bloom et al. ................ 359/152 |
| 2003/0087610 A1 | 5/2003 | Ono |
| 2004/0223689 A1 | 11/2004 | Lempkowski et al. |
| 2006/0033985 A1 | 2/2006 | Mian |
| 2007/0032275 A1 | 2/2007 | Suzuki et al. |

(Continued)

FOREIGN PATENT DOCUMENTS

EP    0 111 390 A2    6/1984
(Continued)

OTHER PUBLICATIONS

Patent Cooperation Treaty, "PCT Search Report and Written Opinion of the International Searching Authority" for International Application No. PCT/US2007/088306 Jun. 23, 2008, 13 pages.
Patent Cooperation Treaty, "PCT Search Report and Written Opinion of the International Searching Authority" for International Application No. PCT/US2007/088304 Jun. 2, 2008, 12 pages.

*Primary Examiner* — Omar Rojas
(74) *Attorney, Agent, or Firm* — Lawrence J. Chapa (57) ABSTRACT

The present disclosure provides an apparatus (100) that can include a first housing (110) and a second housing (120) rotationally coupled to the first housing where the second housing rotates with respect to the first housing about an axis of rotation (170). The apparatus can also include an optical transmitter (130) coupled to the first housing where the optical transmitter can be configured to transmit light. The apparatus can further include a lightguide (140) including a first lightguide end (144) substantially at the axis of rotation where the lightguide can include a second lightguide end (142) located at a distance from the axis of rotation where the second lightguide end is optically coupled to the optical transmitter. The apparatus can additionally include an optical receiver (135) coupled to the second housing at the axis of rotation where the optical receiver can also be optically coupled to the lightguide at the first lightguide end.

19 Claims, 8 Drawing Sheets

U.S. PATENT DOCUMENTS

| | | |
|---|---|---|
| 2007/0065158 A1 | 3/2007 | Shindou et al. |
| 2007/0150764 A1 | 6/2007 | Chen |
| 2007/0153457 A1 | 7/2007 | Hosoya et al. |
| 2007/0286556 A1 | 12/2007 | Kassamakov et al. |
| 2008/0102888 A1 | 5/2008 | Sellgren et al. |
| 2008/0132300 A1 | 6/2008 | Gilmore et al. |
| 2008/0170356 A1* | 7/2008 | Alameh et al. ............... 361/679 |
| 2008/0308755 A1 | 12/2008 | Hashizume et al. |
| 2010/0009727 A1 | 1/2010 | Presutti |

FOREIGN PATENT DOCUMENTS

| | | |
|---|---|---|
| GB | 2406987 A1 | 4/2005 |
| WO | 0221730 B2 | 3/2002 |
| WO | 02057831 A1 | 7/2002 |
| WO | 2005034390 A2 | 4/2005 |
| WO | 2006128239 A | 12/2006 |

* cited by examiner

APPARATUS WITH TWO HOUSINGS INCLUDING A ROTATABLE OPTICAL DATA COMMUNICATION COUPLING

BACKGROUND

1. Field

The present disclosure is directed to an apparatus with two housings including an optical data communication coupling. More particularly, the present disclosure is directed to an optical data communication coupling for use in a phone having two housings, which rotate relative to one another.

2. Introduction

Presently, portable electronic devices, such as cell phones, personal digital assistants, selective call receivers and the like, often involve many form factors, many of which include two housings that move relative to each other. For example, in a flip phone, a cover housing can include a speaker that pivots about a base housing that can include a display, a keypad, and/or a microphone. More complex portable electronic devices can also include a display and buttons on a flip cover housing that pivots on a hinge with respect to a base housing. Such portable electronic devices are increasingly equipped with additional features, such as higher resolution cameras, larger and more displays, fingerprint sensors, and other desirable features.

Each additional feature added to a portable electronic device can increase the amount of data and correspondingly the number of data lines required to adequately convey information between the cover housing and the base housing to facilitate data communications between the components associated with each of the housings. These data lines have typically been routed via a complex multi-layer flex system. A typical flex design is a 6-8 layer flex containing many copper traces, sometimes in excess of 60, grouped closely together in order to pass through a limited hinge space between housings. Such flex circuits can be expensive and can sometimes pose radio frequency and mechanical challenges.

Rotator phones pose additional unique challenges beyond those of flip phones. In a rotator phone, a cover housing rotates relative to a base housing about an axis of rotation that is perpendicular with respect to the front facing of a base housing. In such a rotator phone, the desired motion between the base and the cover housings allows for uninterrupted 180 degree rotation and sometimes even allows for full 360 degree rotation. Unfortunately, full uninterrupted rotation can be difficult with current physical electrical data connections. Therefore, when a rotator phone is rotated, data connections and communications in many prior implementations are interrupted. Furthermore, rotator phones are unable to provide sufficient data lines for additional features on the cover housing. Accordingly, additional desirable features can be difficult to fully support in electronic devices with rotating housings.

Thus, there is a need for uninterrupted data communication during the full rotation of a rotator phone. There is a further need for additional data communication capabilities including the number of signal connections supported and the amount of data throughput a particular signal connection can support between a cover and a base housing in a portable electronic device having two housings that rotate with respect to each other.

SUMMARY

Among other benefits, the present disclosure can provide for full uninterrupted rotation of an electronic device with rotating housings. The present disclosure can also provide for additional data communication capabilities between two housings that rotate with respect to each other. To achieve these and other benefits, the present disclosure provides an apparatus that can include a first housing and a second housing rotationally coupled to the first housing where the second housing rotates with respect to the first housing about an axis of rotation that is substantially perpendicular to a front facing of the apparatus. The apparatus can also include an optical transmitter coupled to the first housing where the optical transmitter can be configured to transmit light. The apparatus can further include a lightguide including a first lightguide end substantially at the axis of rotation where the lightguide can include a second lightguide end located at a distance from the axis of rotation where the second lightguide end is optically coupled to the optical transmitter. The apparatus can additionally include an optical receiver coupled to the second housing at the axis of rotation where the optical receiver can also be optically coupled to the lightguide at the first lightguide end.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
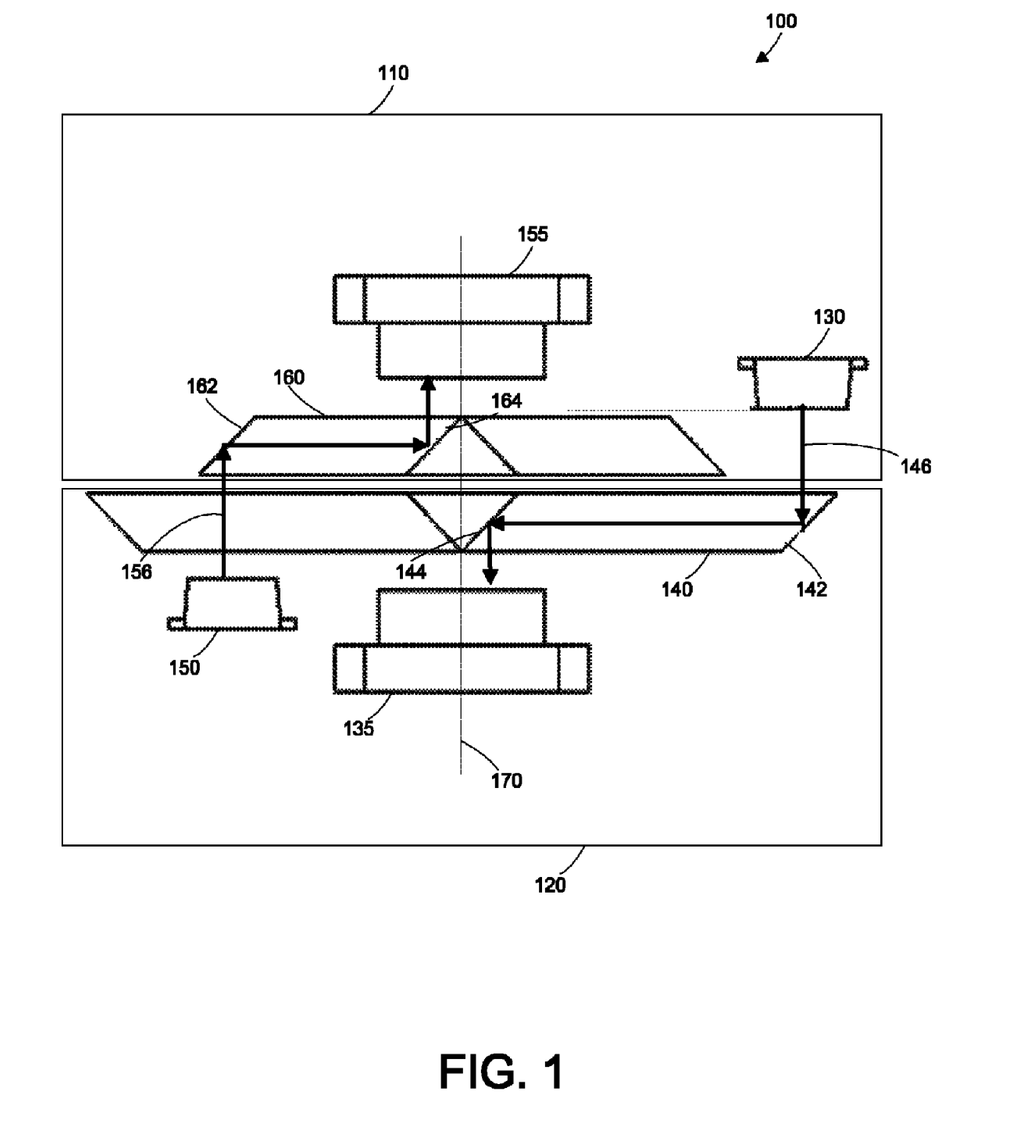
FIG. 1 is an exemplary diagram of an apparatus in accordance with a possible embodiment of the disclosure.

FIG. 1 is an exemplary diagram of an apparatus 100 in accordance with a possible embodiment of the disclosure. The apparatus 100 can be a rotatable optical data coupling, an optical data communication coupling for a rotator phone, or the like. The apparatus 100 can include a first housing 110 and a second housing 120 rotatably coupled to the first housing 110. The second housing 120 can rotate with respect to the first housing 110 about an axis of rotation 170. The second housing 120 can be configured to rotate at least 180 degrees and even over 360 degrees about the first housing 110.

The apparatus 100 can include an optical transmitter 130 coupled to the first housing 110 where the optical transmitter 130 can be configured to transmit light. The apparatus 100 can include a lightguide 140 including a first lightguide end 144 substantially at the axis of rotation 170. The lightguide 140 can be any means for transmitting light between two structures or surfaces. For example, the lightguide 140 can be a tunnel or vacant space, can be a disk structure, can be a fiber optic structure, or can be any other means for transmitting light between two structures or surfaces.

The lightguide can include a second lightguide end 142 located at a distance from the axis of rotation 170. The second lightguide end 142 can rotate about the axis of rotation 170. The second lightguide end 142 can be optically aligned with and/or correspondingly coupled to the optical transmitter 130. The second lightguide end 142 can be a lightguide reflective end having an angle non-parallel with the axis of rotation 170 and the lightguide reflective end can reflect and/or redirect the light 146 received from the optical transmitter 130 towards the first lightguide end 144.

The first lightguide end 144 can include a lightguide reflective section having an angle non-parallel with the axis of rotation 170 and the lightguide reflective section can reflect light 146 received from the lightguide reflective end towards an optical receiver 135. The lightguide reflective section can be a conical reflective section. The optical receiver 135 can be coupled to the second housing 120 at the axis of rotation 170. The optical receiver 135 can also be optically coupled to the lightguide at the first lightguide end 144. The optical receiver 135 can face a substantially opposite direction from the optical transmitter 130. The optical transmitter 130, the lightguide 140, and the optical receiver 135 can provide for uninterrupted optical data communication between the first housing 110 and the second housing 120 throughout part of or throughout the entire rotation of the first housing 110 with respect to the second housing 120.

The optical transmitter 130 can be a first optical transmitter 130, the lightguide can be a first lightguide 140, and the optical receiver 135 can be a first optical receiver 135. The second lightguide end 142 can be a first second lightguide end 142 that is located at a first distance from the axis of rotation 170. The apparatus 100 can further include a second optical transmitter 150 coupled to the second housing 120. The second optical transmitter 150 can be configured to transmit light in substantially the opposite direction from the first optical transmitter 130. The apparatus 100 can include a second lightguide 160 that can include a second first lightguide end 164 substantially at the axis of rotation 170 and a second second lightguide end 162 located at a second distance from the axis of rotation 170. The second distance can be different from the first distance. The second second lightguide end 162 can be optically aligned with and/or correspondingly coupled to the second optical transmitter 150. The apparatus 100 can include a second optical receiver 155 coupled to the first housing 110 substantially at the axis of rotation 170. The second optical receiver 155 can also be optically coupled to the second lightguide 160 at the second first lightguide end 164 and can face a substantially opposite direction from the second optical transmitter 150. The opposite direction associated with the second set of complementary elements can help serve to facilitate non-interfering bi-directional communications between the two housings. In operation, the second optical transmitter 150 can transmit light 156 at the second second lightguide end 162, which can reflect the light 156 to the second first optical end 164, which can reflect the light 156 to the second optical receiver 155.

The first lightguide 140 can be a first disk-shaped lightguide 140 having a first planar surface and a first diameter and the second lightguide 160 can be a second disk-shaped lightguide 160 having a second planar surface and a second diameter where the second diameter can be different from the first diameter and where the first planar surface can be substantially parallel with the second planar surface. The first disk-shaped lightguide 140 can be configured to pass light from the second optical transmitter 150 to the first second lightguide end 162, then to the second second lightguide end 164, then to the second optical receiver 155. The apparatus 100 can further include more than two housings.

For example, two round light guides 140 and 160 can be placed at the centerline 170 of a rotator phone that includes the two housings 110 and 120. In each case the light path for a send unit, such as the optical transmitter 130 can be aimed at the outer circumferential edge, such as the second end 142 of the light guide 140. The light guide second end 142 can have a substantially 45 degree cut that reflects and/or redirects the light signal toward the center of the guide 140. Another angled cut 144 at or near the center of the guide 140 can redirect the light towards the optical receiver 135. The lightguides 140 and 160 can have different diameters. The different diameters and the angle of interaction of a light signal relative to the surface of any intervening at least partially translucent light guides can allow for the light signal from the second optical transmitter 150 to pass completely through the body of one guide, such as the first lightguide 140, before being directed by the second lightguide 160. Some such embodiments can provide for un-interrupted communication during the full rotation of a rotator phone.

Figure 2:
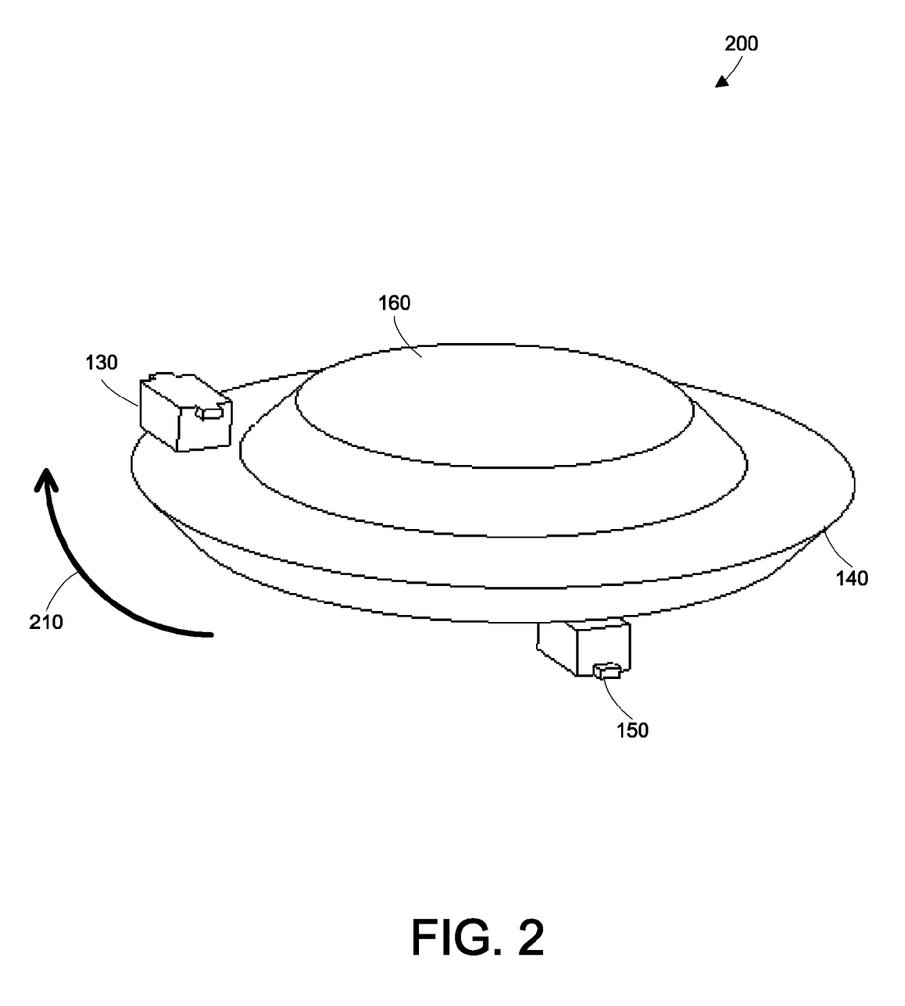
FIG. 2 is an exemplary diagram of an apparatus in accordance with a possible embodiment of the disclosure.

FIG. 2 is an exemplary diagram of an apparatus 200 in accordance with a possible embodiment of the disclosure. The apparatus 200 can include similar elements to the apparatus 100. Such elements can include a first optical transmitter 130, a second optical transmitter 150, and a first lightguide 140 and a second lightguide 160. In at least one embodiment, the circular nature of the lightguides 140 and 160 can provide an appropriately angled portion of the lightguide surface at multiple angles of relative rotation of the two housings without requiring that the lightguides 140 or 160 rotate with one or both of the corresponding housings. Consequently, an optical path between transmitters and receivers can remain constant throughout rotation 210 of the apparatus 200 to provide for substantially uninterrupted data communication between two housings that rotate with respect to each other.

Figure 3:
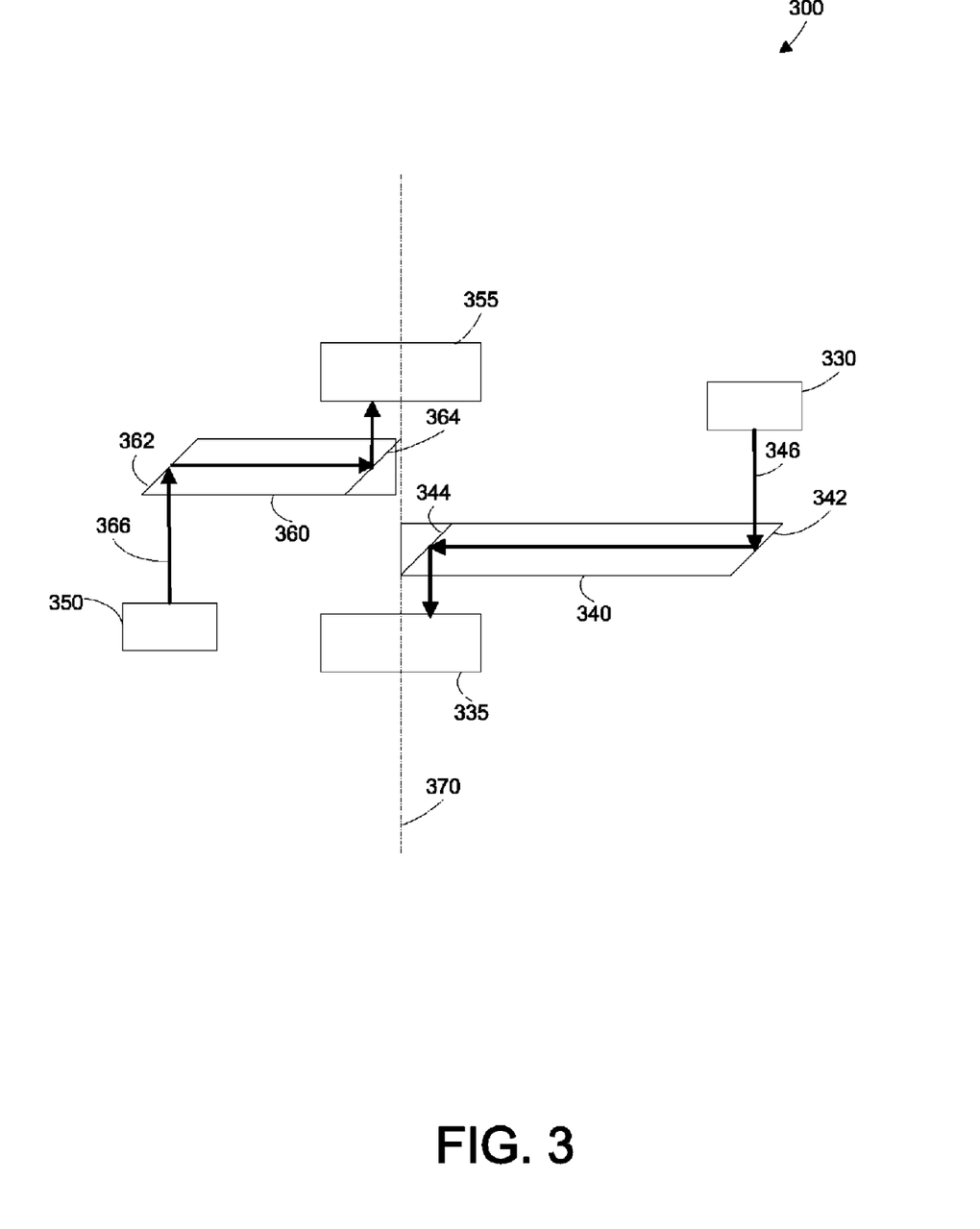
FIG. 3 is an exemplary diagram of an apparatus in accordance with a possible embodiment of the disclosure.

FIG. 3 is an exemplary diagram of an apparatus 300 in accordance with a possible embodiment of the disclosure. Elements of the apparatus 300 can be similar to like elements of the apparatus 100 and the elements can rotate with respect to each other about an axis of rotation 370. The apparatus 300 can include a first optical transmitter 330 that can transmit light 346 intended to be received by a first optical receiver 335. The light 346 can enter a first lightguide 340 at a first end 342 and get reflected to a second end 344 that reflects the light 346 to the first optical receiver 335. The apparatus 300 can also include a second optical transmitter 350 that can transmit light 366 intended to be received by a second optical receiver 355. The light 366 can enter a second lightguide 360 at a first end 362 and get reflected to a second end 364 that reflects the light 366 to the second optical receiver 355. In this embodiment, the lightguides 340 and 360 may be rectangular lightguides, box shaped lightguides, tubular lightguides, or the like that rotate about the axis 370. The lightguides 340 and 360 may be in different positions. For example, in an alternate embodiment to that shown, the first lightguide 340 may be closer to the optical transmitter 330 than the optical receiver 335 and the second lightguide 360 may be closer to the optical transmitter 350 than the optical receiver. Furthermore, while elements such as the optical transmitters 330 and 350 may fully rotate about the axis 370, the elements may rotate less than 360 degrees or may intentionally have sections of interrupted communications depending on the desired design of the apparatus 300.

Figure 4:
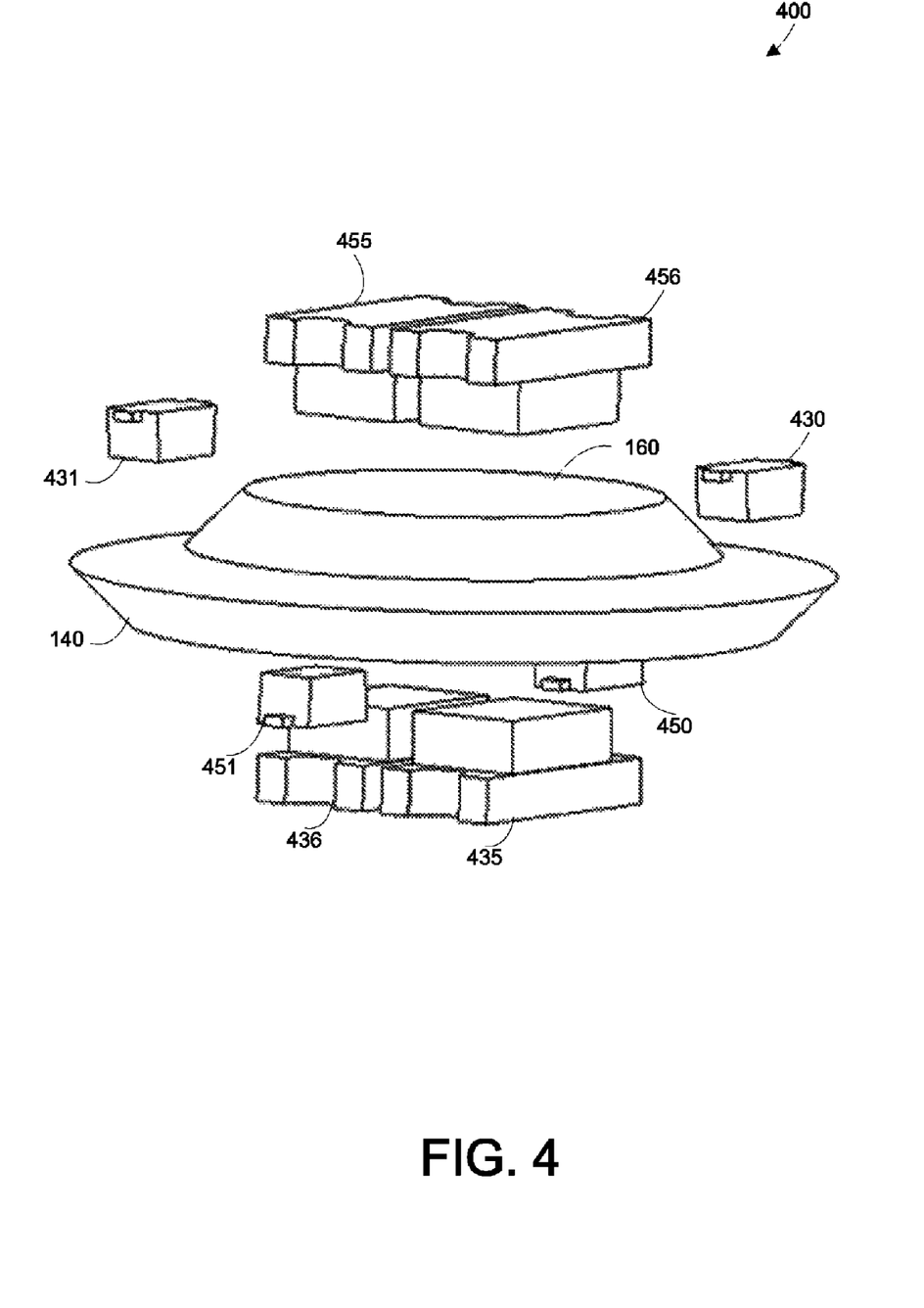
FIG. 4 is an exemplary diagram of an apparatus in accordance with a possible embodiment of the disclosure.

FIG. 4 is an exemplary diagram of an apparatus 400 in accordance with a possible embodiment of the disclosure. Elements of the apparatus 400 can be similar to like elements of the apparatus 100, such as the lightguide 140 and the lightguide 160. The apparatus 400 can include a first optical transmitter 430 that can transmit light intended for a first optical receiver 435. The apparatus 400 can also include a second optical transmitter 431 that can transmit light intended for a second optical receiver 436. The apparatus 400 can further include a third optical transmitter 450 that can transmit light intended for a third optical receiver 455. The apparatus 400 can additionally include a fourth optical transmitter 451 that can transmit light intended for a fourth optical receiver 456. Thus, the present disclosure can provide for multiple optical data paths between two or more housings that rotate with respect to each other. For example, different transmitters in a same housing, such as optical transmitters 430 and 431, may transmit different wavelengths of light that can be filtered for reception by different respective receivers, such as optical receivers 435 and 436.

Figure 5:
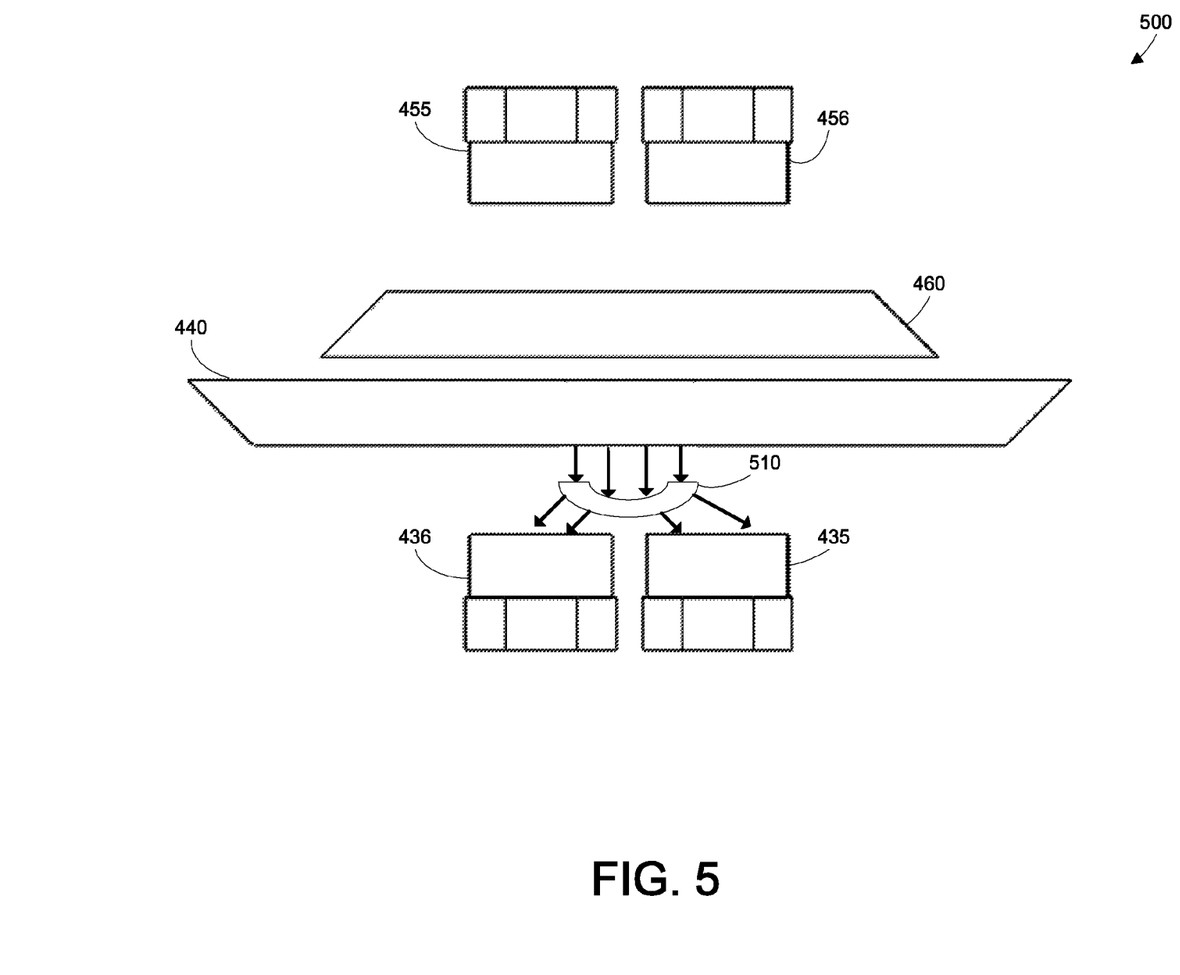
FIG. 5 is an exemplary diagram of an apparatus in accordance with a possible embodiment of the disclosure.

FIG. 5 is an exemplary diagram of an apparatus 500 in accordance with a possible embodiment of the disclosure. Elements of the apparatus 500 can be similar to like elements of the apparatus 100 and the apparatus 400 where some elements are omitted for simplicity. The apparatus 500 can include light guides 440 and 460, optical receivers 435, 436, 455, and 456, and a lens 510, such as an optical lens or a diffuser lens. The lens 510 can be used to spread light evenly to multiple optical receivers, such as optical receivers 435 and 436. The lens 510 may also be used to focus light if, for example, the optical receivers 435 and 436 are at a distance where such focusing would be useful. Separate lenses may also be used separately for diffusion and focusing. Additionally, the lens 510 may be separate from or integrated into the lightguide 440.

Figure 6:
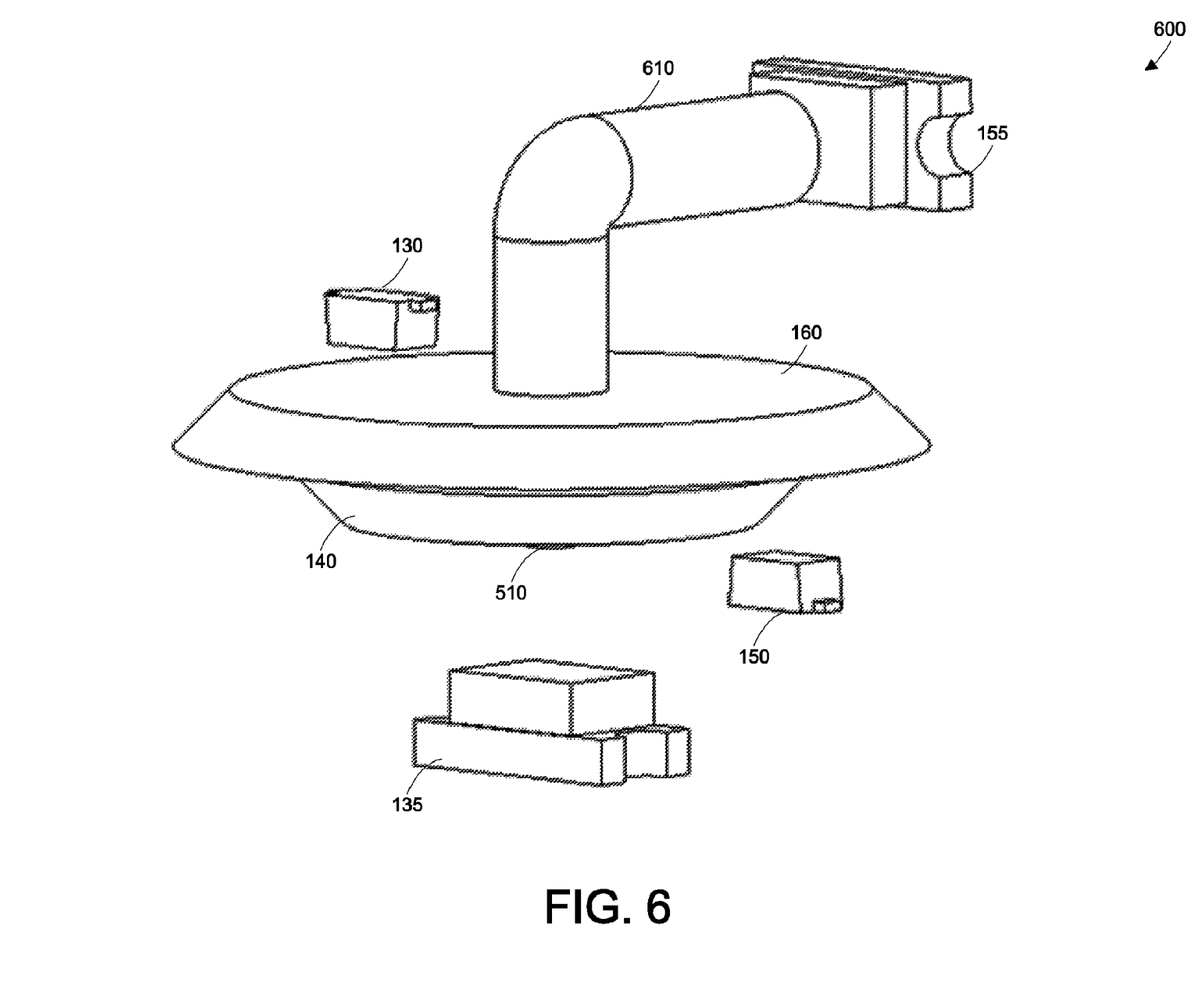
FIG. 6 is an exemplary diagram of an apparatus in accordance with a possible embodiment of the disclosure.

FIG. 6 is an exemplary diagram of an apparatus 600 in accordance with a possible embodiment of the disclosure. Elements of the apparatus 600 can be similar to like elements of the apparatus 100 and the apparatus 500 where some elements are omitted for simplicity. The apparatus 600 can include optical transmitters 130 and 150, lightguides 140 and 160, a lens 510, optical receivers 135 and 155, and an extended light pipe 610. The light pipe 610 can be attached to the lightguide 160 or can be a separate entity. An additional lens can be placed between the lightguide 160 and the light pipe 610 and/or between the light pipe 610 and the optical receiver 155. The light pipe 610 can be used to direct light from the lightguide 160 to the optical receiver 155 that is not close enough or that is in a different orientation for receiving light more directly from the lightguide 160.

Figure 7:
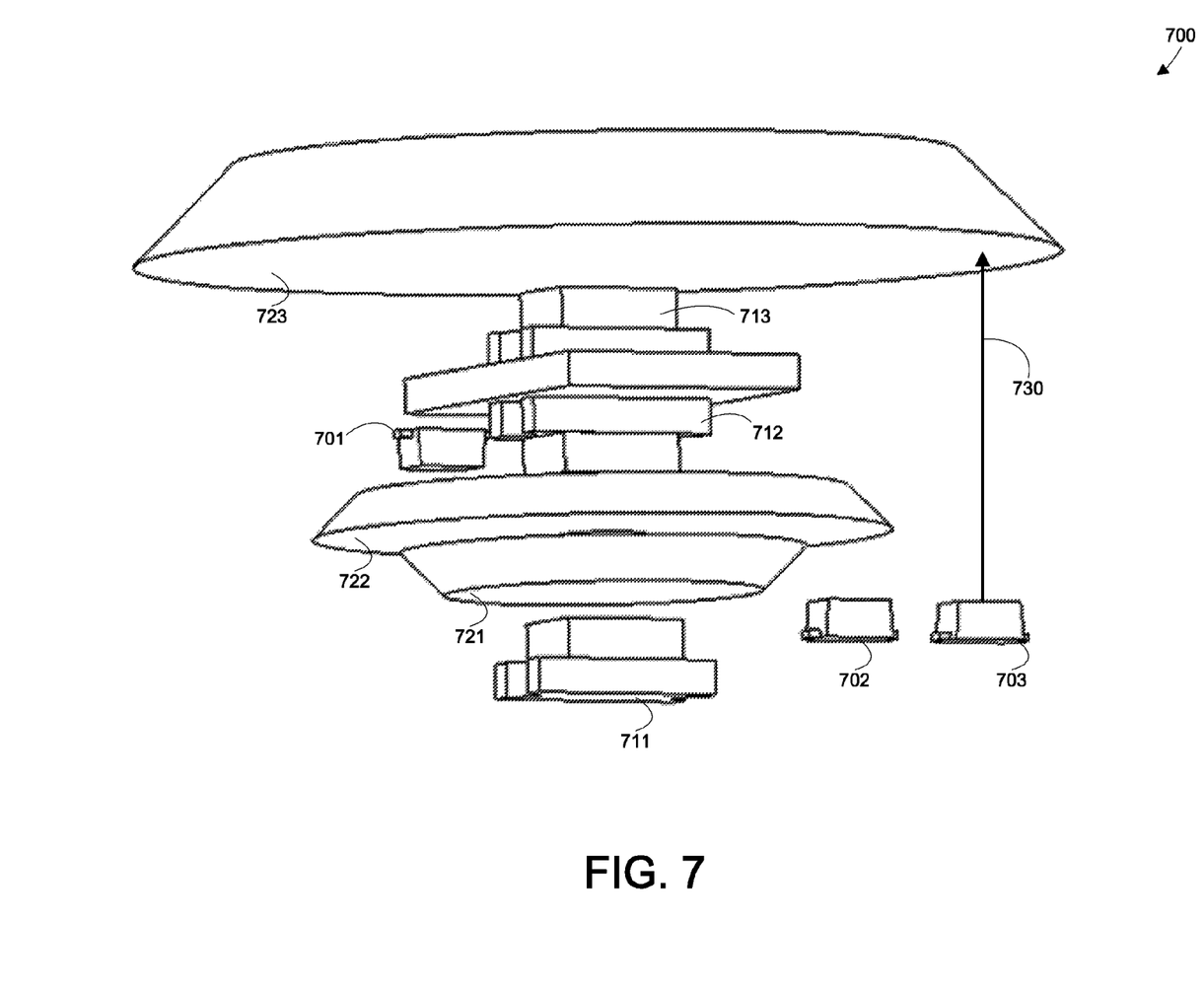
FIG. 7 is an exemplary diagram of an apparatus in accordance with a possible embodiment of the disclosure.

FIG. 7 is an exemplary diagram of an apparatus 700 in accordance with a possible embodiment of the disclosure. Elements of the apparatus 700 can be similar to like elements of the apparatus 100 and other disclosed apparatuses. The apparatus 700 can include optical transmitters 701, 702, and 703, optical receivers 711, 712, and 713, and lightguides 721, 722, and 723. As shown, additional optical transmitter 703, lightguide 723, and optical receiver 713 combinations can be added in various locations to add at least one more additional signal path 730 for optical communication.

In all embodiments, air gaps may or may not exist between optical components. Additionally, different elements may be mounted in different housings. For example, two lightguides may be in one housing or each lightguide may be in a separate housing. Additionally, lens systems and reflective ends can be manufactured as a single solid piece and/or internal reflective features can be created separately. Furthermore, two or more lightguides may be molded as a single piece and may include molded center reflector.

Figure 8:
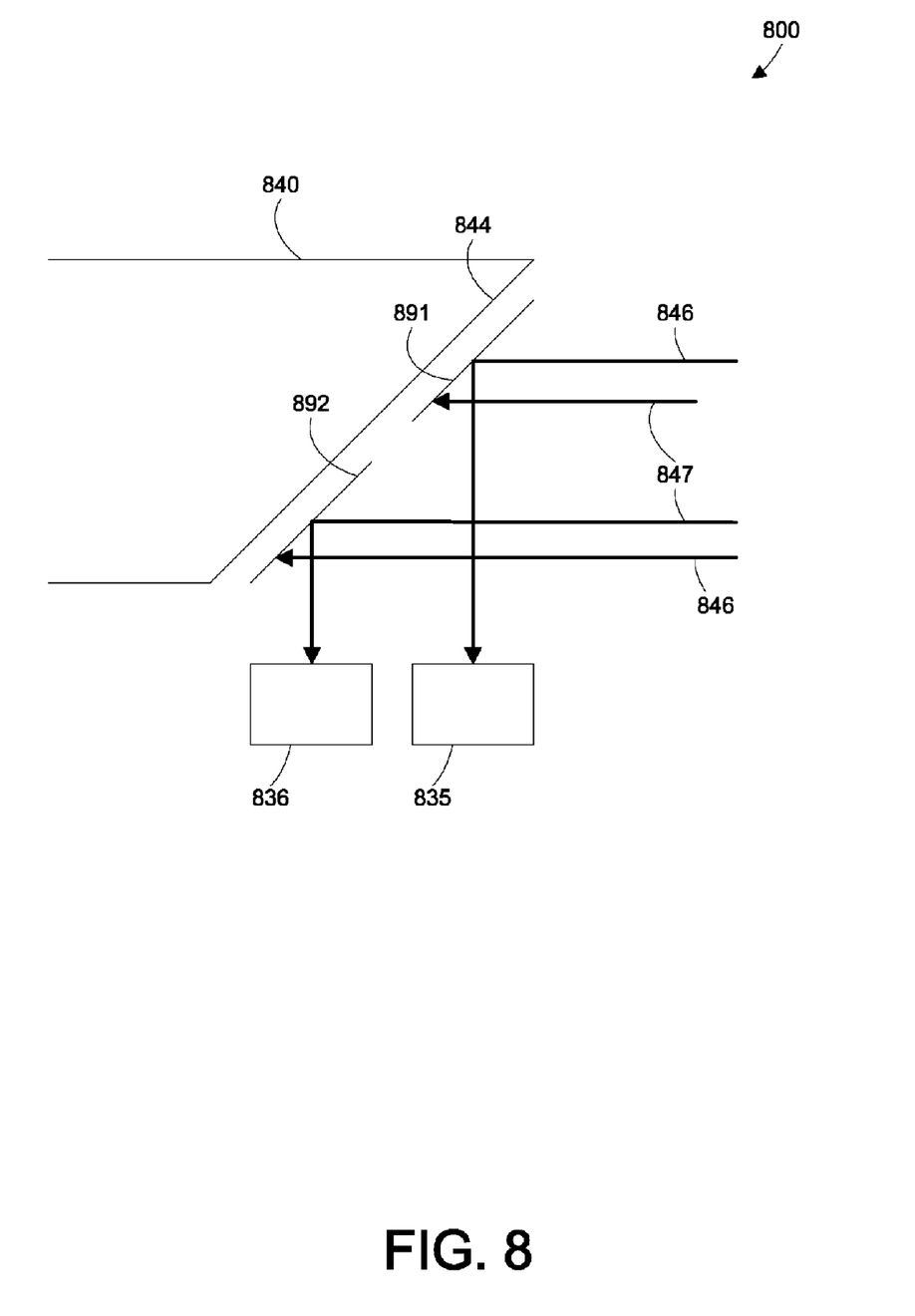
FIG. 8 is an exemplary diagram of an apparatus in accordance with a possible embodiment of the disclosure.

FIG. 8 is an exemplary diagram of an apparatus 800 in accordance with a possible embodiment of the disclosure. Elements of the apparatus 800 can be similar to like elements of the apparatus 100 and other disclosed apparatuses. The apparatus 800 can include a lightguide 840 including a first lightguide end 844, a first optical receiver 835, and a second optical receiver 836. The first lightguide end 844 may include a first filtering material 891 and a second filtering material 892. The different filtering material can absorb or pass light of one wavelength and reflect light of a different wavelength. For example, the filtering material 891 may reflect light of a first wavelength 846 towards the first optical receiver 835 and absorb or pass light of a second wavelength 847. The filtering material 892 may reflect light of a second wavelength 847 towards the second optical receiver 835 and absorb or pass light of the first wavelength 846. Thus, additional channels for data transfer may be implemented by using light of different wavelengths for each channel. Additional filtering may be employed in different manners on different surfaces to provide for additional formats of filtering and reflecting different wavelengths of light.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An apparatus comprising:
a first housing;
a second housing rotationally coupled to the first housing, wherein the second housing rotates with respect to the first housing about an axis of rotation;
an optical transmitter coupled to the first housing, the optical transmitter configured to transmit light;
a lightguide including a first lightguide end substantially at the axis of rotation, the lightguide including a second lightguide end located at a distance from the axis of rotation, wherein the second lightguide end is optically coupled to the optical transmitter; and an optical receiver coupled to the second housing at the axis of rotation, the optical receiver also optically coupled to the lightguide at the first lightguide end, wherein the lightguide comprises a disk-shaped lightguide.

2. The apparatus according to claim 1, wherein the second lightguide end rotates about the axis of rotation.

3. The apparatus according to claim 1, wherein the second lightguide end includes a lightguide reflective end having an angle non-parallel with the axis of rotation, wherein the lightguide reflective end reflects light received from the optical transmitter.

4. The apparatus according to claim 3, wherein the first lightguide end includes a lightguide reflective section having an angle non-parallel with the axis of rotation, wherein the lightguide reflective section reflects light received from the lightguide reflective end towards the optical receiver.

5. The apparatus according to claim 4, wherein the lightguide reflective section comprises a conical reflective section.

6. The apparatus according to claim 1, wherein the second housing is configured to rotate 360 degrees about the first housing and wherein the optical transmitter, the lightguide, and the optical receiver provide for uninterrupted optical data communication between the first housing and the second housing throughout the entire 360 degrees.

7. The apparatus according to claim 1,
wherein the optical transmitter comprises a first optical transmitter, the lightguide comprises a first lightguide, and the optical receiver comprises a first optical receiver,
wherein the second lightguide end is a first second lightguide end that is located at a first distance from the axis of rotation,
wherein the apparatus further comprises:
a second optical transmitter coupled to the second housing, the second optical transmitter configured to transmit light in substantially the opposite direction from the first optical transmitter;
a second lightguide including a second first lightguide end substantially at the axis of rotation, the second lightguide including a second second lightguide end located at a second distance from the axis of rotation, the second distance being different from the first distance, wherein the second second lightguide end is optically coupled to the second optical transmitter; and
a second optical receiver coupled to the first housing substantially at the axis of rotation, the second optical receiver also optically coupled to the second lightguide at the second first lightguide end.

8. The apparatus according to claim 7,
wherein the first lightguide comprises a first disk-shaped lightguide having a first planar surface and a first diameter and the second lightguide comprises a second disk-shaped lightguide having a second planar surface and a second diameter, the second diameter being different from the first diameter, and
wherein the first planar surface is substantially parallel with the second planar surface.

9. The apparatus according to claim 8, wherein the first disk-shaped lightguide is configured to pass light from the second optical transmitter to the second second lightguide end.

10. The apparatus according to claim 1, further comprising:
a first filter configured to reflect light of a first wavelength while passing light of a second wavelength; and a second filter configured to reflect light of the second wavelength while passing light of the first wavelength.

11. An apparatus comprising:
a first housing;
a second housing rotationally coupled to the first housing, wherein the second housing rotates with respect to the first housing about an axis of rotation;
a first optical transmitter coupled to the first housing, the first optical transmitter configured to transmit light;
a second optical transmitter coupled to the second housing, the second optical transmitter configured to transmit light in substantially the opposite direction from the first optical transmitter;
a first lightguide coupled to the second housing including a first first lightguide end substantially at the axis of rotation, the first lightguide including a first second lightguide end located at a first distance from the axis of rotation, wherein the first second lightguide end is optically coupled to the first optical transmitter;
a second lightguide including a second first lightguide end substantially at the axis of rotation, the second lightguide including a second second lightguide end located at a second distance from the axis of rotation, wherein the second second lightguide end is optically coupled to the second optical transmitter;
a first optical receiver coupled to the second housing substantially at the axis of rotation, the first optical receiver also optically coupled to the first lightguide at the first first lightguide end, the first optical receiver facing a substantially opposite direction from the first optical transmitter; and
a second optical receiver coupled to the first housing substantially at the axis of rotation, the second optical receiver also optically coupled to the second lightguide at the second first lightguide end, the second optical receiver facing a substantially opposite direction from the second optical transmitter,
wherein the first lightguide comprises a first disk-shaped lightguide having a first planar surface and the second lightguide comprises a second disk-shaped lightguide having a second planar surface, and
wherein the first planar surface is substantially parallel with the second planar surface.

12. The apparatus according to claim 11, wherein the second disk-shaped lightguide is configured to pass light from the first optical transmitter to the first second lightguide end.

13. The apparatus according to claim 11, wherein the first second lightguide end rotates about the axis of rotation and the second second lightguide end rotates about the axis of rotation.

14. The apparatus according to claim 11, wherein the first second lightguide end includes a lightguide reflective end having an angle non-parallel with the axis of rotation, wherein the lightguide reflective end reflects light received from the first optical transmitter.

15. The apparatus according to claim 14, wherein the first first lightguide end includes a lightguide reflective section having an angle non-parallel with the axis of rotation, wherein the lightguide reflective section reflects light received from the lightguide reflective end towards the optical receiver.

16. The apparatus according to claim 14, wherein the lightguide reflective section comprises a conical reflective section.

17. The apparatus according to claim 11, wherein the second housing is configured to rotate 360 degrees about the first housing and wherein the first optical transmitter, the lightguide, and the first optical receiver provide for uninterrupted optical data communication between the first housing and the second housing throughout the entire 360 degrees.

18. The apparatus according to claim 11, wherein the first optical receiver faces substantially the opposite direction from the second optical receiver.

19. An apparatus comprising:
   a first housing;
   a second housing rotationally coupled to the first housing, wherein the second housing rotates 360 degrees with respect to the first housing about an axis of rotation;
   a first optical transmitter coupled to the first housing, the first optical transmitter configured to transmit light;
   a second optical transmitter coupled to the second housing, the second optical transmitter configured to transmit light in substantially the opposite direction from the first optical transmitter;
   a first disk-shaped lightguide coupled to the second housing, the first disk-shaped lightguide including a first planar surface, a first first lightguide end substantially at the axis of rotation, and a first second lightguide end located at a first distance from the axis of rotation, wherein the first second lightguide end is optically coupled to the first optical transmitter;
   a second disk-shaped lightguide coupled to the first housing, the second disk-shaped lightguide including a second planar surface substantially parallel with the first planar surface, a second first lightguide end substantially at the axis of rotation, and a second second lightguide end located at a second distance from the axis of rotation, wherein the second second lightguide end is optically coupled to the second optical transmitter;
   a first optical receiver coupled to the second housing substantially at the axis of rotation, the first optical receiver also optically coupled to the first disk-shaped lightguide at the first first lightguide end, the first optical receiver facing a substantially opposite direction from the first optical transmitter; and
   a second optical receiver coupled to the first housing substantially at the axis of rotation, the second optical receiver also optically coupled to the second disk-shaped lightguide at the second first lightguide end, the second optical receiver facing a substantially opposite direction from the second optical transmitter,
   wherein the first optical transmitter, the lightguide, and the first optical receiver provide for uninterrupted optical data communication between the first housing and the second housing throughout the entire 360 degrees.

* * * * *